Patented June 20, 1950

2,511,904

UNITED STATES PATENT OFFICE 2,511,904

FIREPROOF AND INSULATING HARDENABLE PLASTIC COMPOSITION

Carl F. N. Clasen and Jennie M. Hummer, Wichita, Kans.

No Drawing. Application March 2, 1948, Serial No. 12,696

1 Claim. (Cl. 106—108)

This invention relates to the manufacture of insulation products and is particularly directed to the manufacture of insulated shingles, siding, or the like.

While some fireproof shingles have been manufactured prior to this invention, there is no shingle on the market today that combines the feature of being an insulator as well. This need has now been overcome and this invention relates to a product that is both a non-conductor of heat and cold, as well as fireproof, hail proof and fast color when desired pigments have been added.

An object of the invention is to provide a product that is both fireproof and acts as an efficient insulating medium.

A further object of the invention is to provide means that, when added to the product, will prevent it from crystallizing too rapidly while being formed, this frequency occurring in prior processes.

A still further object of the invention is to supply a particularly efficient binder; one that is capable of producing a hard and adhesive finished product.

And a still further object of the invention is to produce a product that is permanently colored and will not run, thereby avoiding the stained appearance caused by those products that are not fast-color.

Another object of the invention is to provide a composition that may be readily used in the construction of indoor incinerators, being efficient both as the outside casing or the inside insulating lining.

Other objects and advantages of the invention will be apparent during the course of the following description. It has been discovered that the desired objects of the invention are obtained when the following ingredients are added within the range indicated.

Example I

| | |
|---|---|
| Calcined magnesite _____pounds__ | 10.6–20.0 |
| Mica or vermiculite _____do____ | 2.5–16.8 |
| Wood flour or sawdust_____do____ | 0.4– 4.0 |
| Silica flour _____do____ | 0.8– 6.3 |
| Magnesium chloride__degrees Baumé_ | 20–30 |

The magnesium chloride is mixed separately with water until the desired Baumé strength is obtained and is then added to the already mixed dry ingredients listed above until a putty like mass is obtained. The mixture is then poured into well-oiled molds, vibrated and then let stand for 24 hours to set, after which it is removed from the molds and allowed to dry for about 2–4 days.

In the event that a particular color is desired for the finished product, the proper pigment is added to the dry ingredients and is thoroughly mixed therewith prior to the addition of the magnesium chloride solution.

The density of the magnesium chloride solution will vary depending on the weather, and in the summer, when it is warm and dry, it may be as low as 20° Baumé and in cold weather, when the air is moist, it should be from 25–30° Baumé.

If the product is to be used out of doors, it is desirable to add magnesium sulphate and citric acid to the solution of magnesium chloride prior to mixing the dry materials. The following range obtained good results:

| | Pounds |
|---|---|
| Magnesium sulphate | 10.8–100.0 |
| Citric acid | 0.2– 1.4 |

The solution is adjusted to a 20–30° Baumé strength. This solution is added in very warm weather in order to prevent the composition from crystallizing too rapidly and causing it to crack. The amounts added will depend on the temperature.

While the above range will yield good results, the best results are obtained when the ingredients are kept within the following range:

Example II

| | Pounds |
|---|---|
| Powdered calcined magnesite | 10.6–15.2 |
| Mica or vermiculite | 2.5–13.8 |
| Wood flour or sawdust | 0.4– 2.4 |
| Silica flour | 0.8– 6.3 |

Magnesium chloride solution is added to make a thick paste.

The following is a specific example of the preparation of an insulated, fireproof shingle:

Example III

| | Pounds |
|---|---|
| Powdered calcined magnesite | 12 |
| Mica or vermiculite | 8 |
| Wood flour or sawdust | 2 |
| Silica flour | 4 |

Magnesium chloride solution is added to make a thick paste.

The ingredients are mixed together very thoroughly as best results are obtained by mixing well. The magnesite (dead burned) acts as the binding agent, the remaining ingredients constituting the filler and means to assist in hardening the materials. It is probable that the silica flour reacts with the magnesite to form magnesium silicate and thus renders the composition stronger and increases resistance to the effects of the elements. The magnesium chloride and the magnesite react together, being the binding liquid and the binding agent respectively. The vermiculite or the mica are minerals which in themselves have a high specific heat and further are so interspersed with many air spaces that a most efficient insulating material is produced.

The magnesium chloride solution is prepared by adding the crystals, which are very soluble, to enough water to make a solution of 28° Baumé. To increase the strength of solution, more magnesium chloride is added, and, if it is desired to lower the concentration, more water is supplied. The prepared magnesium chloride solution is then added in sufficient amount to the above dry mix to form a thick paste and all the ingredients are then mixed together. The composition is then poured into well-oiled molds vibrated and allowed to harden and crystallize for 24 hours and is then removed from the molds and permitted to dry for about 2-3 days.

Another example of the amounts employed to make the improved shingle is:

Example IV

|  | Pounds |
|---|---|
| Powdered calcined magnesite | 11 |
| Mica (expanded) | 10 |
| Wood flour | 2 |
| Silica flour | 3 |

These were mixed thoroughly in the manner indicated in Example III. The advantage of using mica is that it is light in weight and an excellent insulator. As a result, a very light and efficient, as well as durable product is obtained. To the above mix was added a solution of magnesium chloride of 22° Baumé and the entire composition was thoroughly mixed, after which it was poured into oiled molds and allowed to stand and crystallize without vibration for 24 hours. The drying period was similar to that of the previous example. The drying temperature will depend upon the temperature and the humidity of the air.

If coloring matter is desired, the proper amounts are added to the dry ingredients and all are thoroughly mixed together prior to the addition of magnesium chloride solution.

In warm weather, the tendency for the composition to crystallize too rapidly is detrimental to the production of the desired final product, for this causes it to crack. The addition of magnesium sulphate and citric acid is effective in preventing this. The magnesium sulphate and citric acid are added in desired amounts to the magnesium chloride solution, which is then adjusted to the proper strength. While the exact action of the magnesium sulphate and citric acid is not clear, it appears that magnesium citrate is formed, which is very soluble, and that when this is added to the composition, it is very efficient in acting as a buffer to prevent premature crystallization of the product.

Example V

To the magnesium chloride solution of Example IV is added:

| Magnesium sulphate | pounds | 25.4 |
|---|---|---|
| Citric acid | ounces | 10 |

The strength of the magnesium chloride solution is adjusted to 22° Baumé and the rest of the process is like that illustrated above.

It has been found, that by varying the ingredients of the composition a superior product is obtained for use in the construction of indoor incinerators. The following has been found to be a range whereby good results are obtained:

|  | Parts |
|---|---|
| White powdered calcined magnesite | 2.8–6.0 |
| Expanded vermiculite | 1.0–5.0 |
| Volcanic ash (powdered) | 1.6–2.3 |

Magnesium chloride solution prepared in the manner described previously, in a strength of 25–30° Baumé. The composition is poured into molds and allowed to harden and then dry from 2–3 days, similarly to the previous examples.

As two specific illustrations of the above process:

Example VI

|  | Parts |
|---|---|
| Magnesium chloride powder | 5 |
| Vermiculite (expanded) | 4 |
| Powdered volcanic ash | 2 |

A 27° Baumé solution of magnesium chloride, is then thoroughly mixed with the dry ingredients and the products are poured into molds to set. These molds are vibrated to drive out all the air spaces and the composition is removed to dry. This product is then used to form the outside casing of the incinerator.

Example VII

The ingredients are prepared exactly as was described in Example VI, except that there was no vibration at all. As a result, when dried, many small air pockets or spaces remain in the finished product to constitute an excellent insulation medium, as well as fireproof material. This is used to line the inside of the incinerator and thereby effectively prevent a transfer of heat to the outer casing.

It is thus readily seen from the above description, that an insulated, as well as fireproof product is obtained, and one that is both durable and light in construction, and capable of many uses.

As many possible embodiments may be made of the invention and as many possible changes, alterations or variations may be made in the embodiments set forth, it being understood that the disclosure is to be taken as illustrative and not in a limiting sense.

Having described the invention, what is claimed as new is:

A fireproof and insulating hardenable plastic composition comprising by weight calcined magnesite 10.6–20.0 parts, vermiculite 2.4–16.8 parts, wood flour 0.4–4.0 parts, silica flour 0.8–6.3 parts, and a plasticizing solution added in an amount to produce a putty-like mass, said plasticizing solution including by weight magnesium sulfate 10.8–100.0 parts, citric acid 0.2–1.4 parts, remainder magnesium chloride and water, the entire plasticizing solution having a density of 20–30° Baumé.

CARL F. N. CLASEN.
JENNIE M. HUMMER.

REFERENCES CITED

The following references are of record in the file of this patent:

UNITED STATES PATENTS

| Number | Name | Date |
|---|---|---|
| 605,637 | Gallinowsky | June 14, 1898 |
| 945,025 | Fauser | Jan. 4, 1910 |
| 2,283,609 | MacDonald | Aug. 28, 1945 |